United States Patent [19]

Latour et al.

[11] Patent Number: 4,979,440
[45] Date of Patent: Dec. 25, 1990

[54] BBQ GRILL INSERT

[76] Inventors: Joseph L. Latour, 3223 Crestview, Pineville, La. 71360; George Spector, 233 Broadway, Suite 3815, New York, N.Y. 10007

[21] Appl. No.: 337,904

[22] Filed: Mar. 30, 1989

[51] Int. Cl.5 .............................................. A47J 27/00
[52] U.S. Cl. ........................................ 99/445; 99/425; 99/482; 126/25 R; 126/39 M
[58] Field of Search ................. 99/425, 444, 445, 446, 99/450, DIG. 15, 482; 126/25 R, 25 A, 25 AA, 25 B, 25 C, 211, 220, 221, 39 M, 51

[56] References Cited

U.S. PATENT DOCUMENTS

| | | | |
|---|---|---|---|
| 1,748,741 | 2/1930 | Tanaki | 99/446 |
| 3,082,757 | 3/1963 | Hohe | 99/445 |
| 3,199,438 | 8/1965 | Myler et al. | 99/450 |
| 3,211,082 | 10/1965 | Sachnoff et al. | 99/444 |
| 3,453,949 | 7/1969 | Levin | 99/446 |
| 4,455,763 | 6/1984 | Elevitch | 99/450 |

Primary Examiner—Timothy F. Simone
Assistant Examiner—Mark Spisich

[57] ABSTRACT

A barbecue grill insert is provided that consists of a plate with a raised rim that is fabricated out of disposable heavy duty heat resistant material. The plate is perforated and when placed upon a permanent cooking grid of the barbecue grill will protect the grid from fluids coming from food thereon. In a modification the insert is so constructed that it can be properly positioned on the bars of the cooking grid so that the fluids from the food will drip down between the bars through the perforations in the plate.

2 Claims, 1 Drawing Sheet

BBQ GRILL INSERT

BACKGROUND OF THE INVENTION

The instant invention relates generally to barbecue grills and more specifically it relates to a barbecue grill insert.

Numerous barbecue grills have been provided in prior art that are adapted to include removable and disposable secondary cooking grids which are placed upon the permanent cooking grids. For example, U.S. Pat. Nos. 3,082,757; 3,552,302 and 3,717,083 all are illustrative of such prior art. While these units may be suitable for the particular purpose to which they address, they would not be as suitable for the purposes of the present invention as heretofore described.

SUMMARY OF THE INVENTION

A primary object of the present invention is to provide a barbecue grill insert that will overcome the shortcomings of the prior art devices.

Another object is to provide a barbecue grill insert that is fabricated out of disposable, perforated, heavy duty heat resistant material which when placed upon the permanent cooking grid will protect the grid from fat and juices from the food thereon.

An additional object is to provide a barbecue grill insert that is constructed so that it can be properly positioned on the bars of the cooking grid so that the fat and juices from the food will drip down between the bars through the perforations in the insert.

A further object is to provide a barbecue grill insert that is simple and easy to use.

A still further object is to provide a barbecue grill insert that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 6 is a cross sectional view as indicated by line 6—6 in

Figure 5:
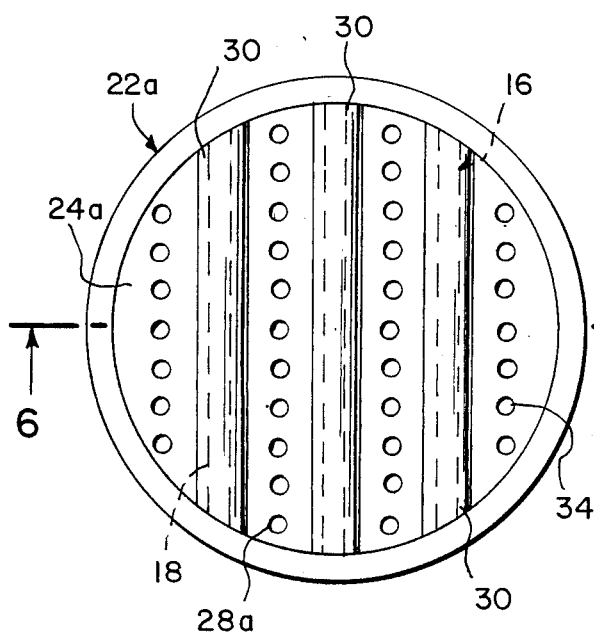
FIG. 5 is a top view of a modified insert having a plurality of parallel spaced apart raised ribs for positioning the insert so that perforations are between the bars of the permanent cooking grid.

FIG. 5 showing the ribs and tapered holes therebetween to allow smoke to reach food and fluids to drip down past the bars of the permanent cooking grid.

DETAILED DESCRIPTION OF THE PREFERRED EMBODIMENTS

Figure 1:
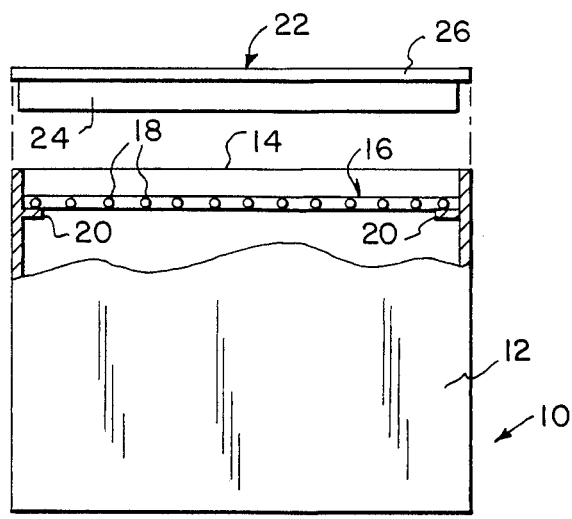
FIG. 1 is an elevational view with parts broken away showing the disposable perforated insert in position to be placed onto the permanent cooking grid of a barbecue grill.

Turning now descriptively to the drawings, in which similar reference characters denote similar elements throughout the several views, FIG. 1 illustrates a barbecue grill 10 that includes a fuel receptacle 12 with an open top 14, a permanent reusable cooking grid 16 with bars 18 and members 20 for supporting the cooking grid 16 adjacent the open top 14. The barbecue grill 10 is not part of the invention.

As seen in FIGS. 1 through 4, the invention is a barbecue grill insert 22 and consists of a plate 24 sized to hold food, such as meat or the like therein when placed upon the bars 18 of the cooking grid 16. The plate 24 is fabricated out of disposable heavy duty heat resistant material, such as aluminum or the like and has a raised rim 26 and a plurality of perforations 28 interiorly of the rim 26. The perforations 28 are of a size to allow smoke to reach the food while fluids, such as fat and grease, from the food can drip down past the bars 18 of the cooking grid 16 so as to protect the bars 18 of the cooking grid 16 from being soiled by the fluids.

Figure 2:
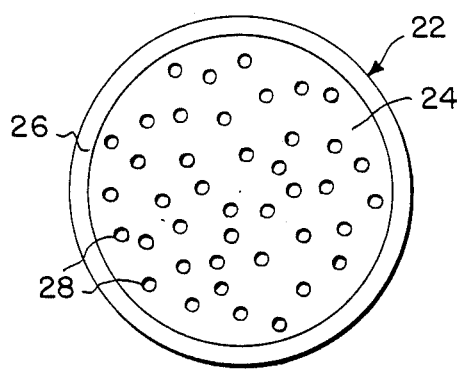
FIG. 2 is a top view of a circular insert as shown in FIG. 1.
Figure 3:
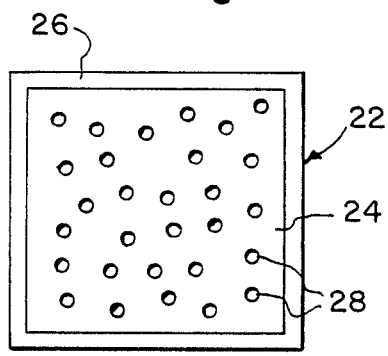
FIG. 3 is a top view of a square insert as shown in FIG. 1.
Figure 4:
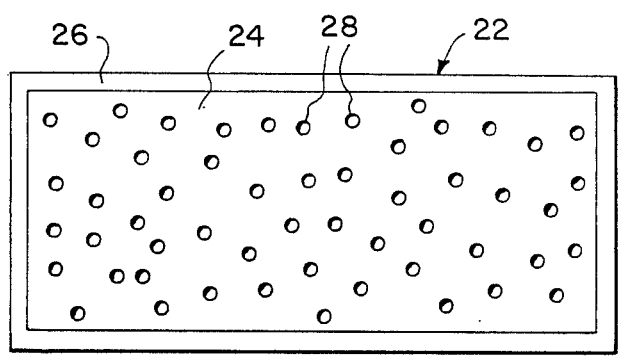
FIG. 4 is a top view of a rectangular insert as shown in FIG. 1.

The plate 24 can be substantially circular in configuration so as to fit upon a circular open top 14 in the barbecue grill 10 (see FIG. 2). The plate 24 can be substantially square in configuration so as to fit upon a square open top 14 in the barbecue grill 10 (see FIG. 3). The plate 24 can be substantially rectangular in configuration so as to fit upon a rectangular open top 14 in the barbecue grill 10 (see FIG. 4). Other types of configurations (not shown) for the plate 24 can also be provided for different open tops 14 in various barbecue grills 10.

Figure 6:
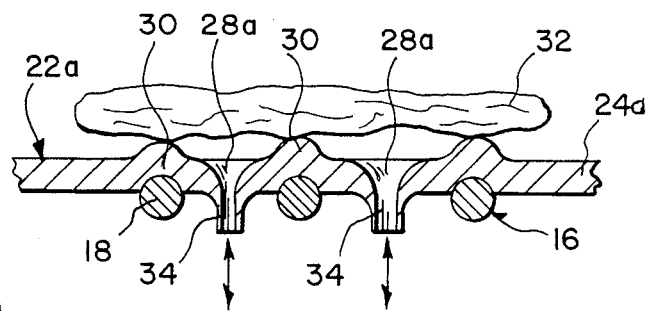

FIGS. 5 and 6 show a modified barbecue grill insert 22a wherein the plate 24a includes a plurality of parallel spaced apart raised ribs 30 which will position the plate 24a onto the cooking grid 16. The perforations 28a are between the bars 18 while the ribs 30 simultaneously elevate the food 32 to allow proper draining of the fluids from the food 32 through the perforations 28a. Each of the perforations 28a has a depending tapered aperture 34 to carry the fluids down past the bars 18 of the permanent cooking grid 16 so that the fluids can drip down into the fuel receptacle 12 of the barbecue grill 10.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A barbecue grill insert for a barbecue grill of the type having a fuel receptacle with an open top, a permanent reusable cooking grid with bars and members for supporting the cooking grid adjacent the open top, said insert comprising a plate sized to hold food therein when placed upon the bars of the cooking grid, said plate fabricated out of disposable heavy duty heat resistant material and having a raised rim and a plurality of perforations extending downwardly beyond said bars interiorly of said rim, said perforations being of a size to allow smoke to reach the food while fluids from the food can drip down past the bars of the cooking grid so as to protect the bars of the cooking grid from being soiled by the fluids; wherein said plate further includes a plurality of parallel spaced apart raised ribs aligned with said bars having a connecting transition surface which will position said plate onto the cooking grid so that said perforations are between the bars while said ribs elevate the food appropriately above said perforations with said transition surface providing proper draining of the fluids from the food through said perforations.

2. A barbecue grill insert as recited in claim 7, wherein each of said perforations having a depending downwardly tapered aperture to carry the fluids down past the bars of the permanent cooking grid so that the fluids can drip down into the fuel receptacle of the barbecue grill.

* * * * *